(12) United States Patent
Lyu

(10) Patent No.: US 6,295,321 B1
(45) Date of Patent: Sep. 25, 2001

(54) VIDEO DECODING METHOD, VIDEO DECODER AND DIGITAL TV SYSTEM USING THE VIDEO DECODING METHOD AND VIDEO DECODER

(75) Inventor: Hwa Young Lyu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/222,343

(22) Filed: Dec. 29, 1998

(30) Foreign Application Priority Data

Dec. 29, 1997 (KR) .................................................. 97/77143

(51) Int. Cl.$^7$ ...................................................... H04N 7/12
(52) U.S. Cl. .................................. 375/240.25; 375/240.28
(58) Field of Search .......................... 375/240.25, 240.28, 375/240.26; 348/419.1, 425.3, 425.4; 386/119–120

(56) References Cited

U.S. PATENT DOCUMENTS

| | | | |
|---|---|---|---|
| 5,563,660 | * 10/1996 | Tsukagoshi | 348/384 |
| 5,588,029 | 12/1996 | Maturi et al. | 375/364 |
| 5,771,075 | * 6/1998 | Rim et al. | 348/512 |
| 5,838,597 | * 11/1998 | Pau et al. | 708/203 |
| 5,889,561 | * 3/1999 | Kwok et al. | 348/405 |
| 5,986,711 | * 11/1999 | Pau | 348/408 |
| 5,990,958 | * 11/1999 | Bheda et al. | 348/407 |
| 6,031,960 | * 2/2000 | Lane | 386/68 |
| 6,047,027 | * 4/2000 | Miyagosi et al. | 375/240 |
| 6,177,961 | * 1/2001 | Blatter | 348/563 |

FOREIGN PATENT DOCUMENTS 7-59047   3/1995   (JP) .................................. H04N/5/92

* cited by examiner

*Primary Examiner*—Vu Le
(74) *Attorney, Agent, or Firm*—Fleshner & Kim, LLP (57) ABSTRACT

A video decoding method and apparatus using the same decode and display a compressed video bit stream output through a video buffer for temporarily storing the video bit stream. The method includes the steps of (a) receiving a single sync signal and an external command to control decoding of the video bit stream; and (b) decoding the input video bit stream, or skipping it, or waiting without decoding under the control of step (a). A video decoder of the present invention includes a decoding control section receptive to a single synchronization signal and an external command to control decoding of the video bit stream, and a video decoder for decoding the video bit stream input through the video buffer, or skipping the video bit stream, or waiting for a defined frame period without decoding the video bit stream under the control of the decoding control section.

23 Claims, 8 Drawing Sheets

(30 Hz, Frame picture, Top field first, Interlaced, 30 Hz Interlaced display)

(30 Hz, Frame picture, Interlaced Source, Top_field_first)

(30 Hz, Frame picture, Interlaced Source, Bottom_field_first)

(60 Hz, Frame picture, Progressive Source)

(24 Hz, Frame picture, Progressive Source)

VIDEO DECODING METHOD, VIDEO DECODER AND DIGITAL TV SYSTEM USING THE VIDEO DECODING METHOD AND VIDEO DECODER

BACKGROUND OF THE INVENTION

1. Field of the Invention

The present invention relates to a video decoding method and a video decoder which is to decode a compressed video bit stream based on a single synchronization signal, and a digital TV system using the video decoding method and the video decoder.

2. Discussion of Related Art

Image compression technology along with digitalization are essential factors in assisting multimedia. Recently data digitalization is making rapid progress, and image compression technology is highlighted.

Moving pictures expert group (MPEG) is the standard of compression and encoding method of digital moving picture which is one of the most important factor in multimedia.

Various technological fields use MPEG technology as compressing algorithm incluiding communication, broadcasting, game, etc. Digital TV is one of them.

MPEG video compression algorithm is based on two basic technologies. It uses motion estimation and compensation in block units to reduce temporal redundancy, and uses discrete cosine transform (DCT) to reduce spatial redundancy.

DCT signals are transmitted through quantization process that reduces data by displaying data in limited bits, variable length coding (VLC) process that reduces total bits by displaying frequently-appearing value in bits of small number, and rarely-appearing value in bits of large number.

And motion vector is acquired in 16×16 block unit, and transmitted with the above VLCed coefficient information. The above motion vector is sometimes VLCed for the maximum efficiency of encoding.

Digital TV that uses this MPEG technology include tuner, demultiplexer, video decoder, and monitor. The tuner selects one-channel among multiple channels received from antenna and decode it, and demultiplexer selects one program which is included in one channel and separate it into packed audio and video bit stream. Because separated video bit stream is coded in variable rate, it is stored temporarily in video buffer for decoding, and output to video decoder in fixed rate. And video decoder removes overheads (all sorts of header information, start codes, and etc.) from input video bit stream, decodes into original value of pixels through VLD of pure data information, inverse-quantization process, inverse discrete cosine transform (IDCT), motion compensation process using motion vector, and sends the result to monitor as output.

The above motion compensation process uses forward and backward prediction blocks, and there are two kinds of motion compensation frame. P-frame is motion-compensated only by forward prediction, and is used to predict the next P-frame in itself. And it is also used in forward and backward prediction of B-frame (predicted frame in both directions). But B-frame is not used for prediction in itself.

That is to say, in MPEG algorithm, I (intra) picture is the base screen when any screen is compressed and encoded, and redundancy of spatial direction is removed through DCT and quantization of original signal per block. P (predicted) picture is the most predicted picture from I,P picture, and prediction error signal and motion vector between motion compensation and already encoded I-picture or P-picture are encoded per macro block. Concerning prediction error signal among these, quantization and VLC are sequentially executed after DCT operation per block. A B (bi-directional) picture is somewhat complex screen selected by method of selecting the most nearly predicted screen among the one consisted through prediction at previous I-, P-picture, backward-predicted one at I-, P-picture and average one of these two methods.

At this time, system time clock (STC), decoding time stamp (DTS) that presents the time when to decode each picture on the basis of STC, presentation time stamp (PTS) that presents the time when to display the decoded data on the basis of STC are multiplexed in A/V multiplex bit stream that enter into above demultiplexer. STC is the entire clock locked with the clock of encoder, and encoder and decoder have the same STC. Because video signal has delay internally, above encoder generates DTS and PTS on the basis of STC and transfer them together for A/V lip-synchronization and normal video decoding.

The above demultiplexer restores STC that make the basis of DTS,PTS from A/V bit stream and make it out to video decoder.

But the above video decoder has various problems.

First, it decodes the compressed video bit stream using DTS,PTS generated on the basis of STC, and displays it. And DTS,PTS signal intervals are not uniform because STC is 27 MHz and unstable clock that varies by surrounding conditions such as noises at the time of transmission. Accordingly, decoding and display become unstable, and especially, display in real system becomes unstable.

Second, circuit becomes complex because digital TV that uses the above video decoder is variously formatted, and synchronization are also input variously according to their format.

Third, the above video decoder uses 3 frame memory to display sequentially when frame is missed or repeated by various reasons. But this brings about waste of memory when display part that have various capability of displaying such as display format transformation is connected to rear side in the case of multi-format video, due to redundancy with a prime memory of display part.

SUMMARY OF THE INVENTION

Accordingly, it is an object of the present invention to provide a video decoding method and a video decoder which is to decode a video bit stream of various picture formats based on a stable single synchronization signal.

Another object of the present invention is to provide a video decoding method and a video decoder which is to decode a video bit stream in the unit of command signal based on a single signal, or skip a picture data bit stream, or waiting without decoding the video bit stream.

Further another object of the present invention is to provide a video decoding method and a video decoder which can reduce decoding time by decoding the header of the next picture continuously in advance when decoding a picture data based on a single synchronization signal.

Further another object of the present invention is to provide a video decoding method and a video decoder which is to wait for a period of 1 frame when an underflow occurs in a video buffer and then decode a bit stream only when it is not determined as underflow after the period of 1 frame.

Further another object of the present invention is to provide a video decoding method and a video decoder which is to check DTS when it is not a trick mode less that the decoding speed should deviate from a defined error.

Further another object of the present invention is to provide a video decoding method and a video decoder which is to decode a bit stream only when the field parity of a decoding picture is in accord with that of a signal synchronization in a case where a video source is decoded by the interlaced scanning method.

Still another object of the present invention is to provide a digital TV system employing the video decoder.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a video decoding method, which is to decode and display a compressed video bit stream output through a video buffer for temporarily storing the video bit stream, includes the steps of: (a) receiving a single sync signal and an external command to control decoding of the video bit stream; and (b) decoding the input video bit stream, or skipping it, or waiting without decoding under the control of step (a).

A video decoder of the present invention, which has a video buffer for temporarily storing a compressed video bit stream, a frame memory for decoding the video bit stream, and a display section for displaying a pixel data of decoded picture, includes: a decoding control section receptive to a single synchronization signal and an external command to control decoding of the video bit stream; and a video decoding section for decoding the video bit stream input through the video buffer, or skipping the video bit stream, or waiting for a defined frame period without decoding the video bit stream under the control of the decoding control section.

The video decoding section decodes the video bit stream input through the video buffer, or skips the video bit stream, or waits for a defined frame period without decoding the video bit stream under the control of the decoding control section.

The video decoding section does not output a pixel data of picture to the display section in the wait or skip mode, while it outputs the pixel data to the display section only in the decoding mode. For the frame not output to the display section, the display section combines the functions with another display section to repeat effectively by use of the display frame memory.

When the video bit stream is decoded based on a signal synchronization signal, the video decoding section decodes the current picture data prior to the next synchronization signal, outputs header information after decoding the header of the next picture continuously in advance and, when the next synchronization signal is input, decodes the next picture data again. It is thus possible for the decoding control section to use header information to examine decoding conditions before the next picture data is decoded.

The decoding control section can realize various trick modes by external commands by properly combining three basic decoding controls such as decoding, skip and wait.

When a video source is an interlaced scanning source, the decoding control section receives header information from the video decoding section to detect the field parity of a decoding picture, and controls the video decoding section to decode a picture data only when the field parity of the detected decoding picture is in accord with that of a single synchronization.

The decoding control section waits for a period of 1 frame and examine underflow of the video buffer when information concerning the underflow of video buffer is input from the video decoding section, or controls the video decoding section to decode the bit stream only when it is not determined as underflow.

The decoding control section checks DTS for every pictures while the video bit stream is decoded in accord with the single synchronization in order not for the decoding speed from deviating from a defined error, and correcting the error by use of the skip or wait mode.

The decoding control section adjusts decoding time for 24 Hz or 23.98 Hz with respect to a video format of 24 Hz or 23.98 Hz and outputs it to the video decoding section.

A digital TV system of the present invention includes:
a tuner for selectively demodulating the frequency of a wanted channel by way of tuning when a digital broadcasting is received via an antenna; a demultiplexer for selecting a wanted program out of a plurality of programs included in one channel to divide into packet audio and video bit streams; a video buffer for temporarily storing the divided video bit stream to be decoded; a decoding control section receptive to a single synchronization signal, an external command, header information and underflow information of the video buffer to control decoding of the video bit stream; a video decoding section for decoding the bit stream input through the video buffer in the unit of picture, or skipping the bit stream, or waiting for a defined frame period without decoding the bit stream under the control of the decoding control section; a 2-frame memory for decoding the video bit stream; and a display section for displaying the pixel data of the picture decoded at the video decoding section.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 1:
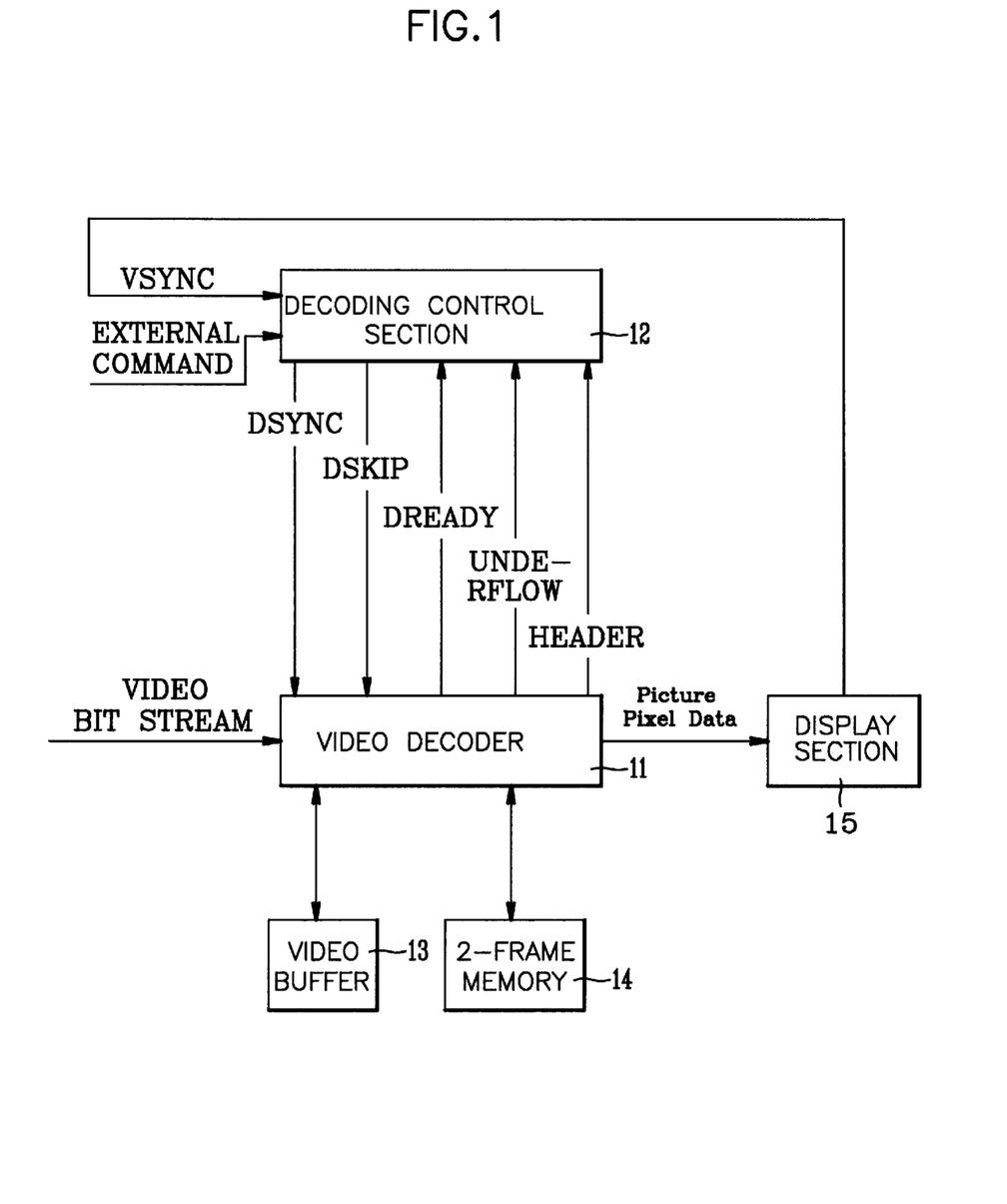
FIG. 1 is a block diagram showing the construction of a video decoder according to the present invention.

FIG. 1 is a block diagram showing the construction of a variable length video decoder according to the present invention. The video decoder comprises: a video decoder 11 for decoding a compressed video bit stream in the unit of picture based on a single vertical synchronization signal VSYNC to be output; a decoding control section 12 receptive to the single vertical synchronization signal VSYNC and an external command for controlling the decoding operation of video decoding section 11 by generating DSYNC and DSKIP signals to the video decoding section 11 under receipt of header information and underflow information from the video decoding section 11; a video buffer 13 for temporarily storing a video bit stream encoded at a variable rate and outputting it to the video decoding section 11 in order to decode the bit stream at a fixed rate; a 2-frame memory 14 for decoding the video bit stream; and a display section 15 for displaying a picture pixel data decoded at the video decoding section 11.

Figure 2A:
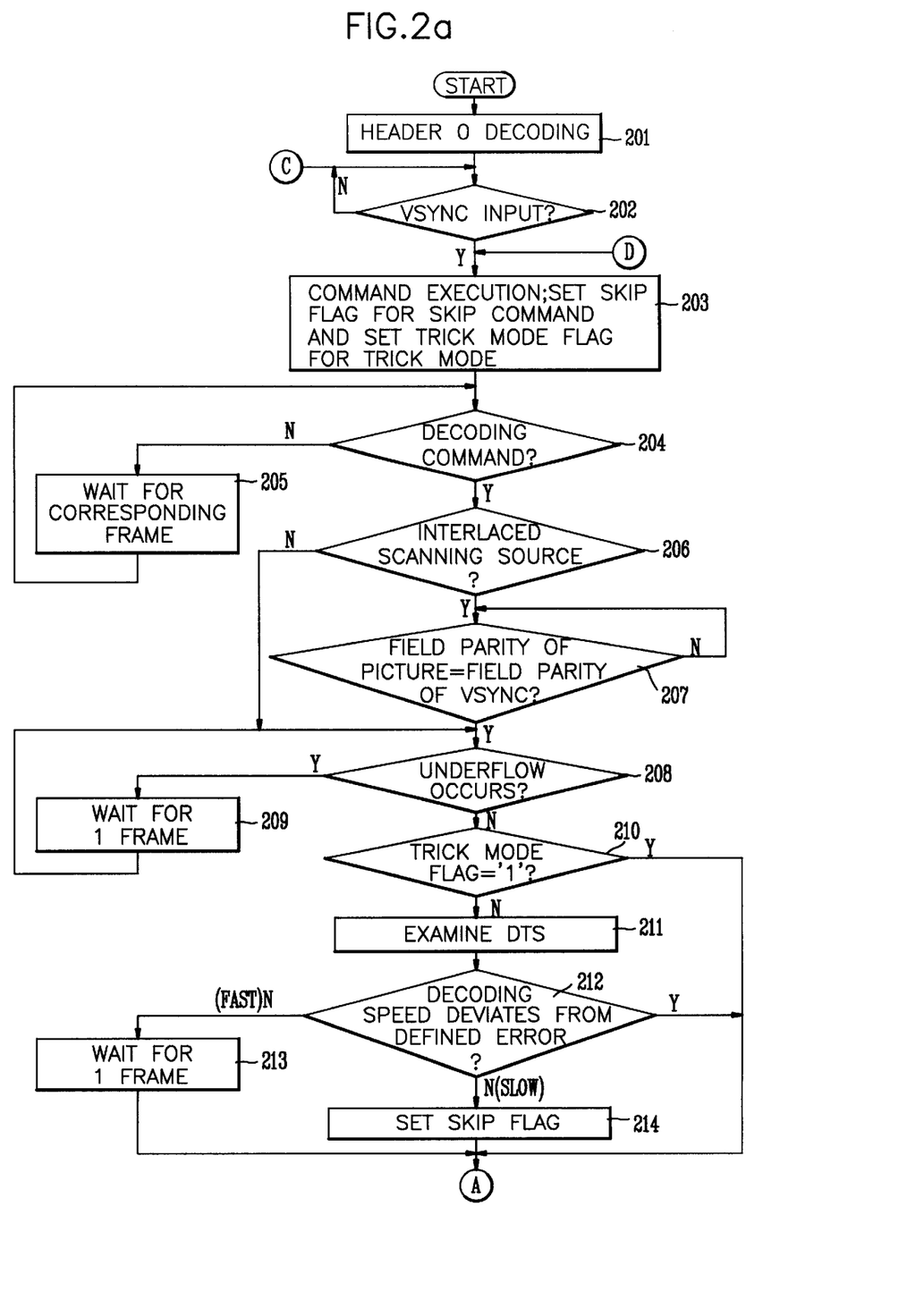
FIGS. 2a and 2b are flow charts showing a video decoding method according to the present invention.
Figure 2B:
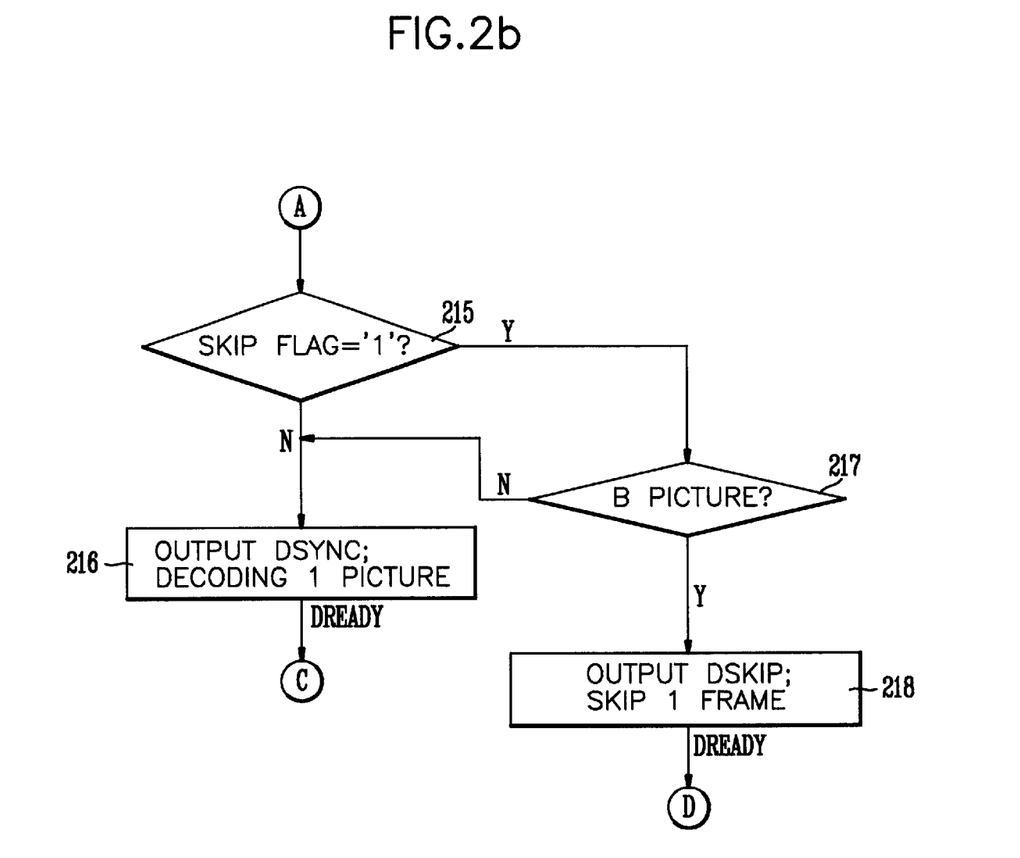

FIGS. 2a and 2b are flows charts showing a video decoding process according to the present invention.

The above-constructed present invention is receptive to a stable single vertical synchronization signal VSYNC to decode a video bit stream of various picture formats based on the VSYNC and output it to the display section, which displays the various picture formats on the screen. The present invention is preferable for a display section having a single display format.

The video decoder 11 receives a compressed video bit stream via the video buffer 13, decoding it in the unit of picture by using the 2-frame memory 14. In other word the decoding control section 12 controls the decoding section 11 to decode a picture in three ways: to decode the video bit stream in the unit of picture, or skip a picture data bit stream, or wait without decoding the picture. These three modes refer to as "decoding", "skip" and "wait", respectively.

Pixel data of a picture decoded at the video decoder 11 is output to the display section 15.

The video decoder 11 does not output the pixel data of picture to the display section 15 in the wait and skip modes and outputs the pixel data to the display section 15 only in the decoding mode, by which process the frame memory 14 can be embodied with two frames instead of three frames. For the frame not output to the display section 15, the display section 15 combines the functions with another display section to repeat effectively by use of the display frame memory.

For this, the video decoder 11 outputs header information, underflow information of buffer 13, and DREADY signal to the decoding control section 12. The decoding control section 12 receives the output signal of video decoding section 11, the signal vertical synchronization signal VSYNC from the display section 15, and an external command so as to output DSYNC and DSKIP signals to the video decoder 11 controlling decoding operation of the video decoder 11.

DSYNC signal is a signal used to start to decode a current picture which is ready to be decoded, while DSKIP signal is a signal used to skip a picture data without decoding. DREADY signal is a signal to decode or skip the picture data at the video decoder 11 and indicates the completion of decoding or skip operation. These operations are explained in connection with FIGS. 3(a) to 3(e).

FIGS. 3(a) to 3(e) are timing diagrams illustrating a display preferable for 30 Hz frame picture, top field first, interlaced scanning source and 30 Hz interlaced scanning.

Figure 3:
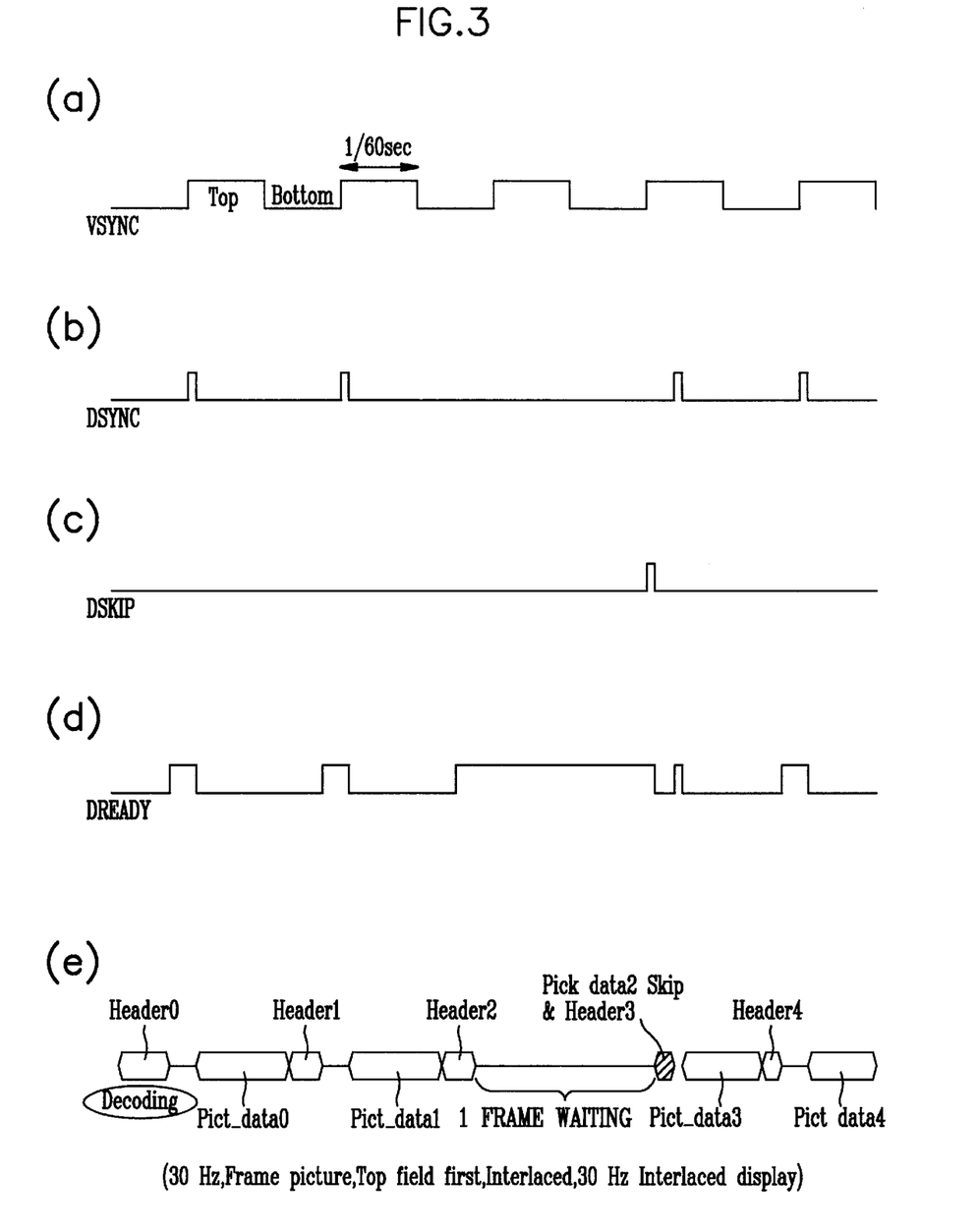
FIGS. 3(a) to 3(e) are timing diagrams in case of 30 Hz, frame picture, top field first, interlaced scanning source and 30 Hz interlaced scanning.
Figure 4:
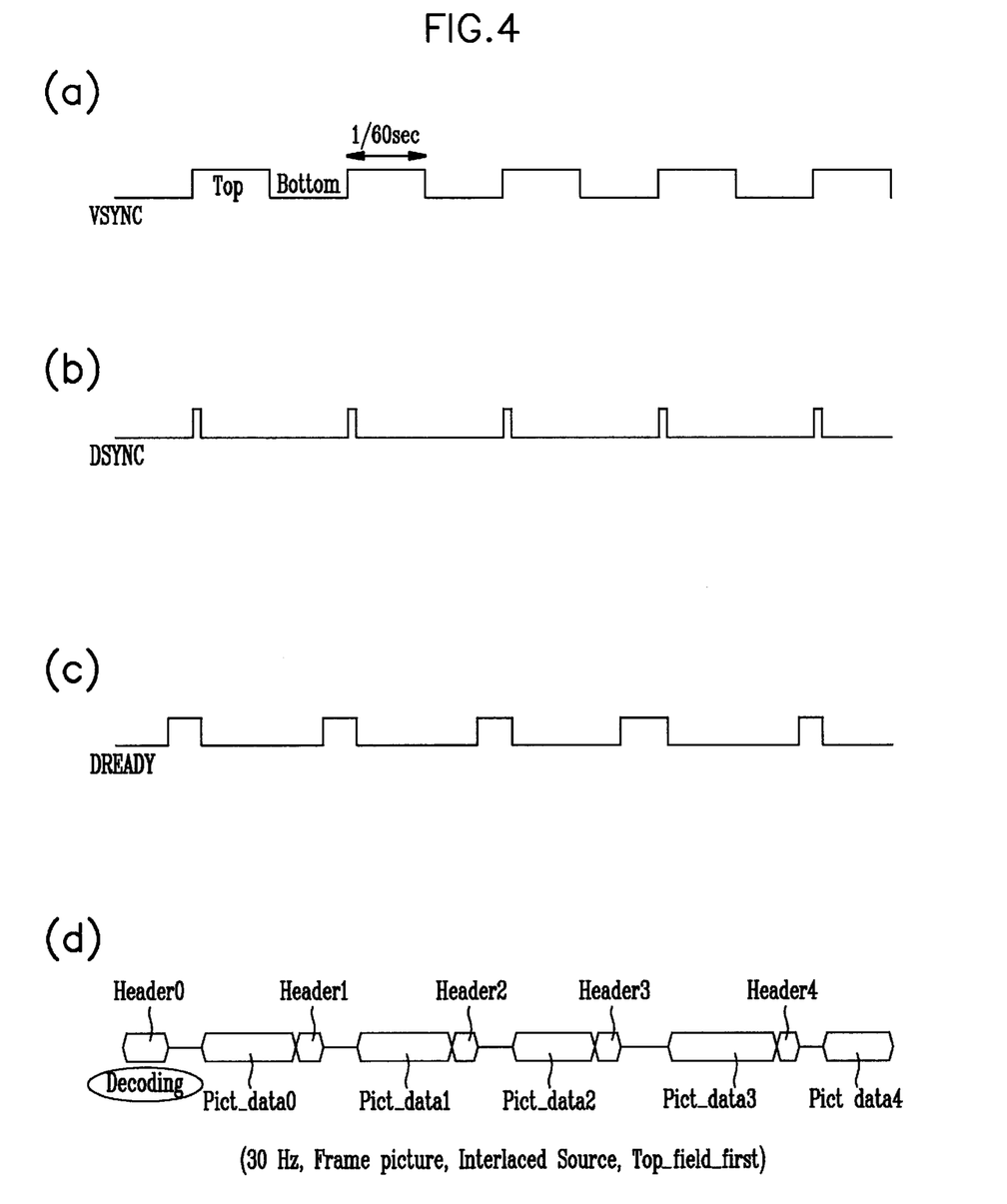
FIGS. 4(a) to 4(d) are timing diagrams in case of 30 Hz, frame picture, interlaced scanning source and top field first.
Figure 5:
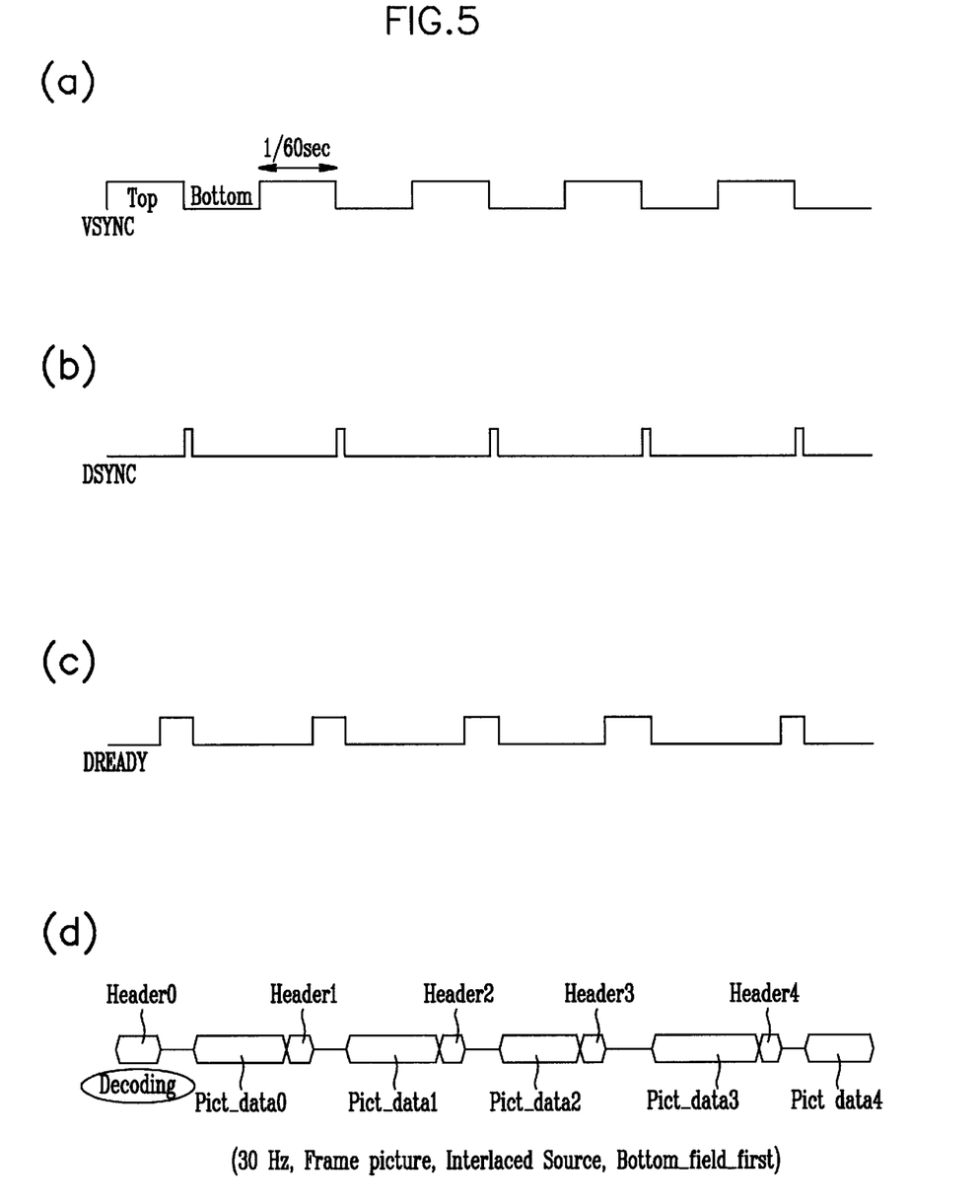
FIGS. 5(a) to 5(d) are timing diagrams in case of 30 Hz, frame picture, interlaced scanning source, bottom field first.
Figure 6:
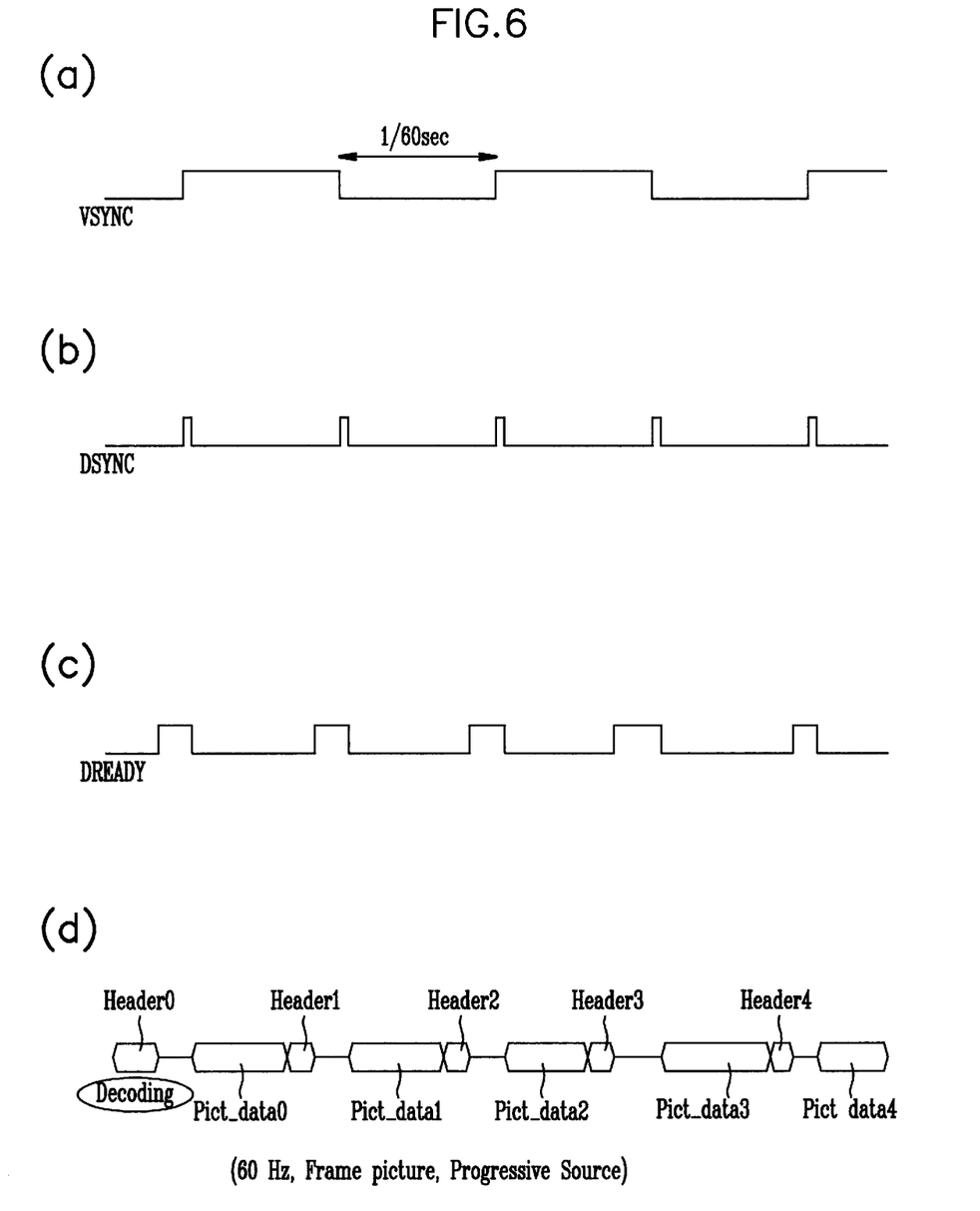
FIGS. 6(a) to 6(d) are timing diagrams in case of 60 Hz, frame picture and sequential scanning source.
Figure 7:
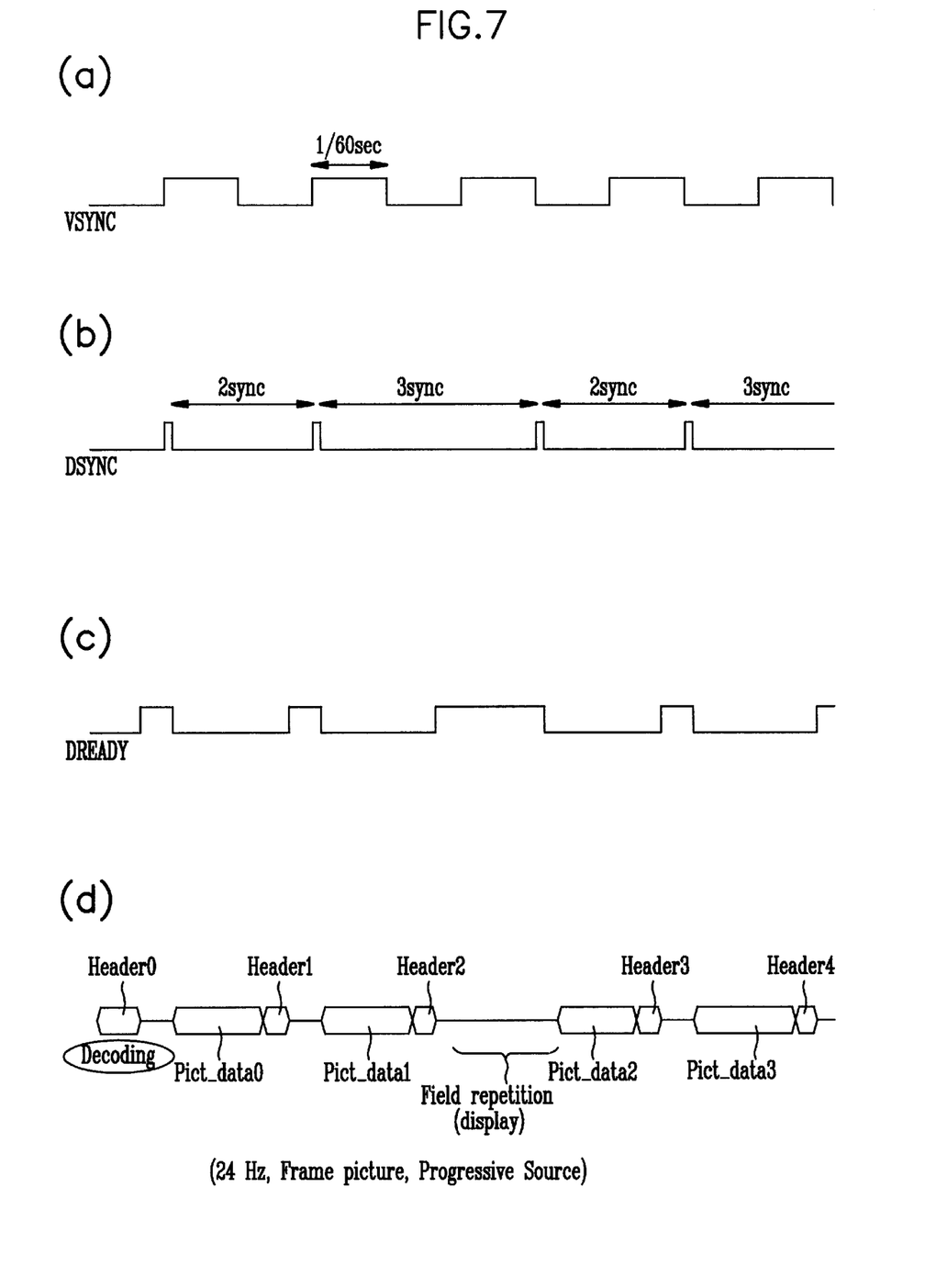
FIGS. 7(a) to 7(d) are timing diagrams in case of 24 Hz, frame picture and sequential scanning source.

As shown in FIG. 3(a), the video decoder section 11 is receptive to VSYNC signal varying in the cycle of 60 Hz from the display section 15 and performs a top field display when the VSYNC signal is "1" or a bottom field display when the VSYNC signal is "0". As shown in FIGS. 3(b) and 3(c), DSYNC and DSKIP signals are synchronized with VSYNC signal. Preferably the picture to be decoded is at 30 Hz and 1 picture is decoded in synchronization with variation of two VSYNCs signals as shown in FIG. 3(e). The top field first is decoded in synchronization with the top of VSYNC signal. If there is either DSYNC signal that indicates to decode or DSKIP signal that indicates to skip at the top of VSYNC signal, the display decoder 11 waits for a period of 1 frame without a decoding or skip, as shown in FIG. 3(e). In this case, the DREADY signal is set to '1 (HIGH)'.

As shown in FIGS. 3(a) to 3(e), because a skip command, e.g., DSKIP signal, is input at the top of the next VSYNC signal after waiting for a period of 1 frame, picture data 'Pict$_{13}$ data 2' and the next header 'Header 3' are skipped. As the skip operation is to erase a data and performed so fast, the video decoder 11 outputs the DREADY signal in the '1' state to the decoding control section 12 immediately after the skip operation. The decoding control section 12 outputs the DSYNC signal to the video decoder section 11 as soon as possible under receipt of the READY signal in the '1' state. The video decoder 11 decodes the currently input picture data 'Pict_data 3' and the next header 'Header 4'. Following the decoding, the DREADY signal in the '1' state is output to the video control section 12 again. It can be thus understood that data decoding and skip operations are performed while the DREADY signal is LOW.

When decoding a picture data based on the VSYNC signal, the video decoder 11 performs a decoding operation in such a manner that it decodes the current picture data prior to VSYNC signal and, when VSYNC appears after decoding the header of the next picture continuously in advance, decoding the next picture data again. Header information is already decoded when the next VSYNC signal appears since the next header is decoded in advance after the previous picture. So, the decoding control section 12 uses the header information in examination of decoding conditions before it decodes the next picture data at VSYNC. This makes it possible to rapidly determine whether or not the data is decoded. Furthermore, there is sufficient for time because the time remaining after decoding the previous picture is used for the header information.

For this reason, header information of the next picture required to examine decoding conditions is output to the decoding control section 12 from the video decoder 11 in advance prior to decoding the next picture.

At the start of the flow chart of the process, the decoding control section 12 controls to decode the header 'Header 0' of the first picture, in step 201, waiting for VSYNC signal.

Under receipt of VSYNC signal, in step 202, a judgement is formed as to whether or not the current picture is decoded according to an externally input command, in step 203. That is, a skip flag is set to '1' when the external command is a skip command, or a trick mode flag is set to '1' for use in the DTS check state in the trick mode. This is because A/V lip synchronization must be matched by examining DTS in the normal decoding mode but it must not be matched in the trick mode.

If the external command is determined as a command to decode the current picture, in step 204, the flow of the process goes on to judge whether the source is interlaced scanning source or progressive scanning source, in step 206. When the external command is determined as a command to wait without decoding, decoding is not performed for a period of the frame, in step 205.

The external command is to input a decoding, skip or wait command to each picture according to whether it is normal display mode or trick mode.

When the external command is determined as a command to decode the current picture, in step 204, a judgement is formed as to whether or not the picture to be decoded is an interlaced scanning source, in step 206. The result of the judgement formed in step 206 indicates that the picture is an interlaced scanning source, the field parity of the picture to be decoded is obtained from header information and then compared with the field parity of VSYNC signal, in step 207. If the field parity of the picture to be decoded is in accord with that of VSYNC signal, the flow of the process goes on to step 208 for examining the underflow of video buffer 13. If not, the decoding control section 12 waits until the next VSYNC signal appears and the field parity of the picture to be decoded is in accord with that of VSYNC signal. This is to decode the picture in accordance with each field by determining top and bottom fields. Accordingly, the video decoder 11 can output the field parity of the picture in accordance with that of VSYNC of display section 15. Conventionally, the field parity of the picture to be decoded can be output to the display section 15 without being in accordance with the field parity of VSYNC, in which case the display section 15 needs 1 field memory in matching the field parities. On the contrary, the present invention does not need to match the field parities and 1 field memory can be saved at the display section 15.

On the other hand, when the video source is a sequential scanning source, in step 206, or the field parity of the picture to be decoded is in accord with that of VSYNC, in step 207, the video decoder 11 receives the underflow of video buffer 13 in order to examine the underflow, in step 208. As there exists no bit stream for 1 picture at the video buffer 13 in a case where the video buffer 13 is underflow, the decoding control section 12 waits for a period of 1 frame and then examines the underflow of video buffer 13, in step 209. Underflow information of the video buffer 13 indicates whether or not there exists a data of at least 1 picture in the video buffer 13. With this, the underflow of video buffer 13 can prevent a decoding time of 1 picture from exceeding a defined period. That means, data of 1 picture to be decoded are not all stored in video buffer 13 when there occurs underflow in the video buffer 13, and it is needed to wait for a data while the data is decoded. And, decoding is not performed in a defined interval and the process goes on to the next interval. This adversely affects display.

Therefore, only when it is not determined as underflow, in step 208, a judgement is formed as to whether a trick mode flag is set to '1', in step 210.

The trick mode is an abnormal mode of MPEG, corresponding to fast forward (FF), slow motion, search and the like in a video cassette recorder (VCR). Thus decoding control section 12 can provide various trick modes by external commands by properly combining three cases, decoding, skip and wait. For example, FF is achieved by combining decoding and skip, while slow motion is realized by combination of decoding and wait. The other trick modes can also be realized by such a combination.

If the trick mode flag is set to '1', in step 210, the flow of the process goes on to step 215 for examining a skip flag. When the trick mode flag is reset to '0', indicating normal MPEG, DTS signal is checked, in step 211, and a judgement is formed as to whether VSYNC and DTS signals deviate from a defined error, in step 212. The present invention performs decoding based on VSYNC and DTS is only checked.

When the result of the judgement formed in step 212 indicates that VSYNC or DTS signals does not deviate from a defined error, the flow of the process goes on to step 215. If the decoding speed deviates from a defined error and is high, the control section 12 waits for a period of 1 frame, in step 213, and the flow of the process goes on to step 215. If the decoding speed is lower than a defined error, the skip flag is set to '1', in step 214, and the flow of the process goes on to step 215. As described above, the decoding control section 12 decodes a picture in accordance with VSYNC signal and checks DTS signal for every pictures in order to prevent the decoding speed from deviating from a defined error. When deviating from a defined error, the decoding control section 12 matches A/V lip synchronization by correcting the error by skip or wait.

The skip flag is examined in step 215. The skip flag set to '1' indicates to skip the current picture.

If the skip flag is set to '0', in step 215, the decoding control section 12 outputs DYNC signal to video decoder 11 in order to decode 1 frame. The video decoder 11 decodes the current picture by DSYNC signal and, after decoding, outputs the DREADY signal in the '1' state to the decoding control section 12 again, in step 216. The decoding control section 12 counts down for every VSYNC with a Number_Of_VSYNC register. As the DREADY signal is set to '1' again and Number_Of_VSYNC signal register is '0', it waits for the next VSYNC. The initial value of Number_Of_VSYNC register indicates the number of VSYNC signal required to decode the current video format. With this, the time required for decoding is calculated and the data of various video formats can be decoded in accordance with the time by use of a single VSYNC signal.

For example, as VSYNC signal is varied in the cycle of ⅟60 second, the initial value of Number_Of_VSYNC register is set to '1' for 60 Hz and '2' for 30 Hz.

On the other hand, if the skip flag is set to '1', in step 215, a judgement is formed as to whether or not the current picture is B picture, in step 217. If the current picture is B picture, the decoding control section 12 outputs DSKIP signal to video decoding section 11 in order to skip 1 frame. The video decoding section 11 skips the B picture under the DSKIP signal and, after skipping the B picture, outputs the DREADY signal in the '1' state to the decoding control section 12, in step 218. If the DREADY signal is set to '1' again, the decoding control section 12 returns to step 203 for executing a command for the next picture, repeating the above operation.

If the current picture is determined as I or P picture, in step 217, the DSYNC signal is output to the video decoding section 11 while the skip flag is set to '1' to skip the next B picture. The video decoder 11 decodes the I or P picture under the DSYNC signal and, after decoding the picture, outputs the DREADY signal in the '1' state to the decoding control section 12, in step 216.

This is to skip the next B picture that does not cause errors instead of I or P picture so as to satisfy skip conditions.

Actually, there is no problems to realize A/V lip synchronization or trick mode when only B picture is skipped to provide a skip function.

On the other hand, the present invention performs a special decoding for 24 Hz. The initial value of Number_Of_VSYNC register is repeatedly set to 2 and 3 alternately in order to change decoding time of every pictures. This is to output in accord with VSYNC signal so as for the display section to perform 3:2 full-down in order to change the frequency from 24 Hz to 60 Hz for display.

Furthermore, the video formats includes NTSC family such as 59.94, 29.97 and 23.98 Hz, which are decoded in the same manner as 60, 30 and 24 Hz. VSYNC signal is decoded at 59.94 Hz instead of 60 Hz.

FIGS. 4 to 7 illustrate the way that various video formats are decoded.

FIGS. 4(a) to 4(d) are timing diagrams showing the operation of a video decoder according to the present invention for 30 Hz, frame picture, interlaced scanning source and top field first. As shown in FIG. 4(a), VSYNC signal varying in the cycle of 60 Hz is input from the display section 15. VSYNC signal in the '1' state indicates the top field display and VSYNC signal in the '0' state indicating the bottom field display. DSYNC is synchronized with VSYNC signal as shown in FIG. 4(b). In this case the picture to be decoded is 30 Hz and 1 picture is decoded in synchronization with variation of two VSYNC signals as shown in FIG. 4(d). For top field first, the picture is decoded in synchronization with the top of VSYNC signal.

FIGS. 5(a) to 5(d) are timing diagrams showing the operation of a video decoder according to the present invention for 30 Hz, frame picture, interlaced scanning source and bottom field first. As shown in FIG. 5(a), VSYNC signal varying in the cycle of 60 Hz is input from the display section 15. VSYNC signal in the '1' state indicates the top field display, and VSYNC signal in the '0' state indicating the bottom field display. DSYNC signal is synchronized with the bottom of VSYNC signal as in FIG. 5(b), in which case the picture to be decoded is 30 Hz and 1 picture is decoded in synchronization with variation of two VSYNC signals as shown in FIG. 5(d). For bottom field first, the picture is decoded in synchronization with the bottom of VSYNC.

FIGS. 6(a) to 6(d) are timing diagrams showing the operation of a video decoder according to another preferred embodiment of the present invention for 60 Hz, frame picture and sequential scanning source. As shown in FIG. 6(a), VSYNC signal varying in the cycle of 60 Hz is input from the display section 15 and a picture data is sequentially decoded irrespective of top and bottom. DSYNC signal is synchronized with VSYNC as shown in FIG. 6(b), in which case the picture to be decoded is 60 Hz and 1 picture is decoded in synchronization with variation of one VSYNC signal as shown in FIG. 6(d).

FIGS. 7(a) to 7(d) are timing diagrams showing the operation of an MPEG decoder according to another preferred embodiment the present invention in the case of 24 Hz, frame picture and sequential source. In FIG. 7(a), VSYNC signal varying in the cycle of 60 Hz is input from the display section 15 and the occurrence interval of DSYNC signal is varied. In other words the initial value of Number_Of_VSYNC register is repeatedly set to 2 or 3 alternately to change the decoding time of every pictures. The repetition of field as shown in FIG. 7(d) can be realized by charging the previous top or bottom field at the display section 15.

On the other hand, the video decoder of the present invention is applicable to a digital TV with a consequence of improvement of performance.

As described above, the video decoder of the present invention is receptive to a stable single vertical synchronization signal for decoding a video bit stream of various image formats based on the signal syncrhonization signal and outputs to the display section in accord with the single vertical synchronization signal. This stabilizes decoding and display and simplifies the decoding circuit, so that the display section can easily display various image formats on the screen.

Especially, the signal flow is made easier and the decoding circuit is simplified as the decoding control section 12 is receptive to a single vertical synchronization signal VSYNC, an external command, header information and information concerning underflow of the video buffer and controls the video decoding section to decode a picture data bit stream in the unit of picture, or skip the bit stream, or wait without coding.

The video decoder 11 does not output a pixel data of picture to the display section in the wait or skip mode, while it outputs the pixel data to the display section only in the decoding mode, which makes it possible to use the minimum memory required for decoding the bit stream, that is, video buffer and 2-frame memory to reduce the size of frame memory.

When the video bit stream is decoded based on a signal synchronization signal, the video decoder 11 decodes the current picture data prior to the next synchronization signal, outputs header information after decoding the header of the next picture continuously in advance and, when the next synchronization signal is input, decodes the next picture data again. It is thus possible for the decoding control section to use header information to examine decoding conditions before the next picture data is decoded, thereby reduce time for determining whether or not the current picture is decoded.

Furthermore, the decoding control section 12 can realize various trick modes by external commands by properly combining three basic decoding controls such as decoding, skip and wait.

When a video source is an interlaced scanning source, the decoding control section 12 receives header information from the video decoder 11 to detect the field parity of a decoding picture, and controls the video decoding section to decode a picture data only when the field parity of the detected decoding picture is in accord with that of a single synchronization. As a result, there is not need to use a field memory in matching the parities and the size of memory can be reduced at the display section.

The decoding control section waits for a period of 1 frame and examine underflow of the video buffer when information concerning the underflow of video buffer supplied from the video decoding section indicates the underflow of video buffer, or decodes only when it is not determined as underflow. This makes is possible to prevent a decoding time of 1 picture from exceeding a defined interval due to underflow of the video buffer.

The decoding control section 12 checks DTS signal for every pictures while the video bit stream is decoded in accord with the single synchronization in order not for the decoding speed from deviating from a defined error, and correcting the error by use of the skip or wait mode, thereby matching A/V lip synchronization accurately.

And, a decoding time for every pictures is changed alternately for a video format having a picture of 24 Hz or 23.98 Hz, facilitating full-down operation at the display section 15.

Furthermore, the entire system is simplified since 59.94 Hz is used instead of 60 Hz as the single synchronization signal to decode a picture data for a video format of NTSC family such as 59.94, 29.97 and 23.98 Hz.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A video decoding method, which is to decode and display a compressed video bit stream output through a video buffer for temporarily storing the video bit stream, the method comprising the steps of:

(a) receiving a single sync signal and an external command to control decoding of the video bit stream; and (b) at least one of decoding the input video bit stream, skipping it, and waiting without decoding under the control of step (a), wherein in the control step (a), if the current picture is B picture while a skip flag is set, the B picture is skipped.

2. The method as claimed in claim 1, wherein in the decoding step (b), a pixel data of picture is not output in order to be displayed in a skip or a wait mode and the pixel data of decoded picture is output in order to be displayed only in a decoding mode.

3. The method as claimed in claim 1, wherein in the decoding step (b), when the video bit stream is decoded based on the single sync signal, header information is output to the control step (a) after a current picture data is decoded before the next sync signal and a header of the next picture is continuously decoded in advance, and when the next sync signal is input, the next fixture data is decoded.

4. The method as claimed in claim 1, wherein in the decoding step (b), a trick mode by the external command is executed by a combination of decoding, skip and wait modes under the control of the control step (a).

5. The method as claimed in claim 1, wherein in the control step (a), when a video source is an interlaced scanning source, the field parity of a picture to be decoded is detected under receipt of header information supplied from the decoding step (b) and then a picture data is decoded only when the field parity of the picture detected is in accord with that of a single synchronization.

6. The method as claimed in claim 1, wherein in the control step (a), when underflow information of the video buffer is input from the decoding step (b), a picture data is decoded after waiting until it is not determined as underflow.

7. The method as claimed in claim 1, wherein in the control step (a), a decoding time stamp is checked for every picture as decoding the video bit stream in accord with a single synchronization and, if a decoding speed deviates from a defined error, a skip or wait command is output to the decoding step (b) to correct errors.

8. The method as claimed in claim 7, wherein if the decoding speed is higher than a defined error, it waits for a period of defined frame without decoding so as not for the decoding speed not to deviate from the defined error.

9. The method as claimed in claim 7, wherein if the decoding speed is lower than a defined error, a defined frame is skipped so as not for the decoding speed not to deviate from the defined error.

10. The method as claimed in claim 1, wherein in the control step (a), decoding time stamp is not checked when the external command is the trick mode.

11. The method as claimed in claim 1, wherein in the control step (a), if the current picture is I or P picture while the skip flag is set, the I or P picture is decoded as the skip flag is set.

12. The method as claimed in claim 1, wherein in the control step (a), a decoding time for every pictures is changed alternately for a video format of 24 Hz.

13. A video decoder comprising:

a video buffer for temporarily storing a compressed video bit stream;

a frame memory for decoding the video bit stream;

a display section for displaying a pixel data of decoded picture;

a decoding control section receptive to a single synchronization signal and an external command to control decoding of the video bit stream; and a video decoder for decoding the video bit stream input through the video buffer, or skipping the video bit stream, or waiting for a defined frame period without decoding the video bit stream under the control of the decoding control section, wherein if the current picture is B picture while a skip flag is set, the video decoding section is controlled to skip the B picture.

14. The video decoder as claimed in claim 13, wherein the single synchronization signal of the video decoding section is a vertical synchronization signal supplied from the display section.

15. The video decoder as claimed in claim 13, wherein the pixel data of a picture is not output to the display section in wait and skip modes the pixel data of a decoded picture is output to the display section only in a decoding mode.

16. The video decoder as claimed in claim 13, wherein when the video bit stream is decoded based on a signal synchronization signal, the video decoding section decodes the current picture data prior to the next synchronization signal, outputs header information after decoding the header of the next picture continuously in advance and, when the next synchronization signal is input, decodes the next picture data.

17. The video decoder as claimed in claim 13, wherein when a video source is an interlaced scanning source, the decoding control section receives header information from the video decoding section to detect the field parity of a decoding picture, and controls the video decoding section to decode a picture data only when the field parity of the detected decoding picture is in accord with that of a single synchronization.

18. The video decoder as claimed in claim 13, wherein when underflow information of the video buffer is input from the video decoding section, the decoding control section waits for a period of defined frame until it is not determined as underflow.

19. The video decoder as claimed in claim 13, wherein a decoding time stamp is checked for every pictures while the video bit stream is decoded in accord with the single synchronization and, if a decoding speed deviates from a defined error, a skip or wait command is output to the video decoding section to correct errors.

20. The video decoder as claimed in claim 13, wherein if the current picture is I or P picture while the skip flag is set, the video decoding section is controlled to decode the I or P picture as the skip flag is set.

21. The video decoder as claimed in claim 13, wherein a decoding time for every pictures is varied alternately for a video format of 24 Hz.

22. The video decoder as claimed in claim 13, wherein 59.94 Hz is used as the single synchronization signal to perform a decoding for a video format of NTSC family such as 59.94, 29.97 and 23.98 Hz.

23. A digital TV system comprising:
- a tuner for selectively demodulating the frequency of a wanted channel by way of tuning when a digital broadcasting is received via an antenna;
- a demultiplexer for selecting a wanted program out of a plurality of programs included in one channel to divide into packet audio and video bit streams;
- a video buffer for temporarily storing the divided video bit stream to be decoded;
- a decoding control section receptive to a single synchronization signal, an external command, header information and underflow information of the video buffer to control decoding of the video bit stream;
- a video decoding section for decoding the bit stream input through the video buffer in the unit of picture, or skipping the bit stream, or waiting for a defined frame period without decoding the bit stream under the control of the decoding control section;
- a 2-frame memory for decoding the video bit stream; and
- a display section for displaying the pixel data of the picture decoded at the video decoding section.

* * * * *